United States Patent [19]
Hall

[11] Patent Number: 5,838,304
[45] Date of Patent: Nov. 17, 1998

[54] PACKET-BASED MOUSE DATA PROTOCOL

[75] Inventor: John C. Hall, Redmond, Wash.

[73] Assignee: Microsoft Corporation, Redmond, Wash.

[21] Appl. No.: 947,044

[22] Filed: Oct. 8, 1997

Related U.S. Application Data

[60] Continuation of Ser. No. 825,652, Jan. 23, 1992, which is a division of Ser. No. 626,393, Dec. 10, 1990, Pat. No. 5,125,077, which is a continuation of Ser. No. 568,057, Aug. 16, 1990, abandoned, which is a continuation of Ser. No. 371,529, Jun. 26, 1989, abandoned, which is a division of Ser. No. 119,314, Nov. 9, 1987, Pat. No. 4,866,602, which is a continuation of Ser. No. 548,122, Nov. 2, 1983, abandoned.

[51] Int. Cl.$^6$ .................................................. G06F 3/033
[52] U.S. Cl. ..................... 345/157; 345/163; 340/825.21; 395/821
[58] Field of Search ........................... 340/825.44, 825.2, 340/825.21; 345/145, 157, 163; 395/821, 850

[56] References Cited

U.S. PATENT DOCUMENTS

| | | | |
|---|---|---|---|
| 3,613,090 | 10/1971 | Mason | 342/29 |
| 3,625,083 | 12/1971 | Bose | 345/167 |
| 3,643,148 | 2/1972 | Brown et al. | 318/628 |
| 3,732,557 | 5/1973 | Evans et al. | 345/179 |
| 3,739,347 | 6/1973 | Forsberg | 345/162 |
| 3,789,218 | 1/1974 | Blount | 250/231.13 |
| 3,852,721 | 12/1974 | Tucker et al. | 345/182 |
| 3,911,419 | 10/1975 | Bates et al. | 345/162 |
| 4,272,758 | 6/1981 | Giraud | 340/310.02 |
| 4,292,474 | 9/1981 | Morrell et al. | 379/157 |
| 4,298,957 | 11/1981 | Duvall et al. | 707/522 |
| 4,303,914 | 12/1981 | Page | 345/179 |
| 4,370,648 | 1/1983 | Wagner et al. | 340/825.2 |
| 4,375,103 | 2/1983 | Arneth et al. | 375/358 |
| 4,390,873 | 6/1983 | Kirsch | 345/166 |
| 4,390,967 | 6/1983 | Eglowstein et al. | 395/281 |
| 4,514,726 | 4/1985 | Whetstone et al. | 345/163 |
| 4,518,961 | 5/1985 | Davis et al. | 340/825.44 |
| 5,125,077 | 6/1992 | Hall | 395/821 |

FOREIGN PATENT DOCUMENTS 56-104561  8/1981  Japan .

OTHER PUBLICATIONS

"Mouse P–4 Interactive Graphic Input Device" Le Lieu, Switzerland, Feb. 23, 1982.
Vincent Biancomano, "Personal Computer Keyboards" Electronic Design. Sep. 29, 1983.
Fields, "Mouse Tracks Path By Electronics Only," Electronics. Oct. 20, 1982, pp. 48–49.

*Primary Examiner*—Thomas G. Black
*Assistant Examiner*—Jack M. Choules
*Attorney, Agent, or Firm*—Klarquist Sparkman Campbell Leigh & Whinston, LLP

[57] ABSTRACT

Data is transmitted from a mouse to a host computer in accordance with a 3-byte packet protocol. The first byte includes bits indicating the status of first and second buttons on the mouse. The first bit of each byte serves as a sync bit. The sync bit has a value of "1" in the first byte and a value of "0" in each of the second and third bytes. Data representing movement of the mouse in two dimensions is encoded as two 8-bit twos-complement integers which are transmitted as part of the three-byte packet.

29 Claims, 2 Drawing Sheets

| | B6 | B5 | B4 | B3 | B2 | B1 | B0 |
|---|---|---|---|---|---|---|---|
| Byte 1 | 1 | LEFT | RIGHT | Y7 | Y6 | X7 | X6 |
| Byte 2 | 0 | X5 | X4 | X3 | X2 | X1 | X0 |
| Byte 3 | 0 | Y5 | Y4 | Y3 | Y2 | Y1 | Y0 |

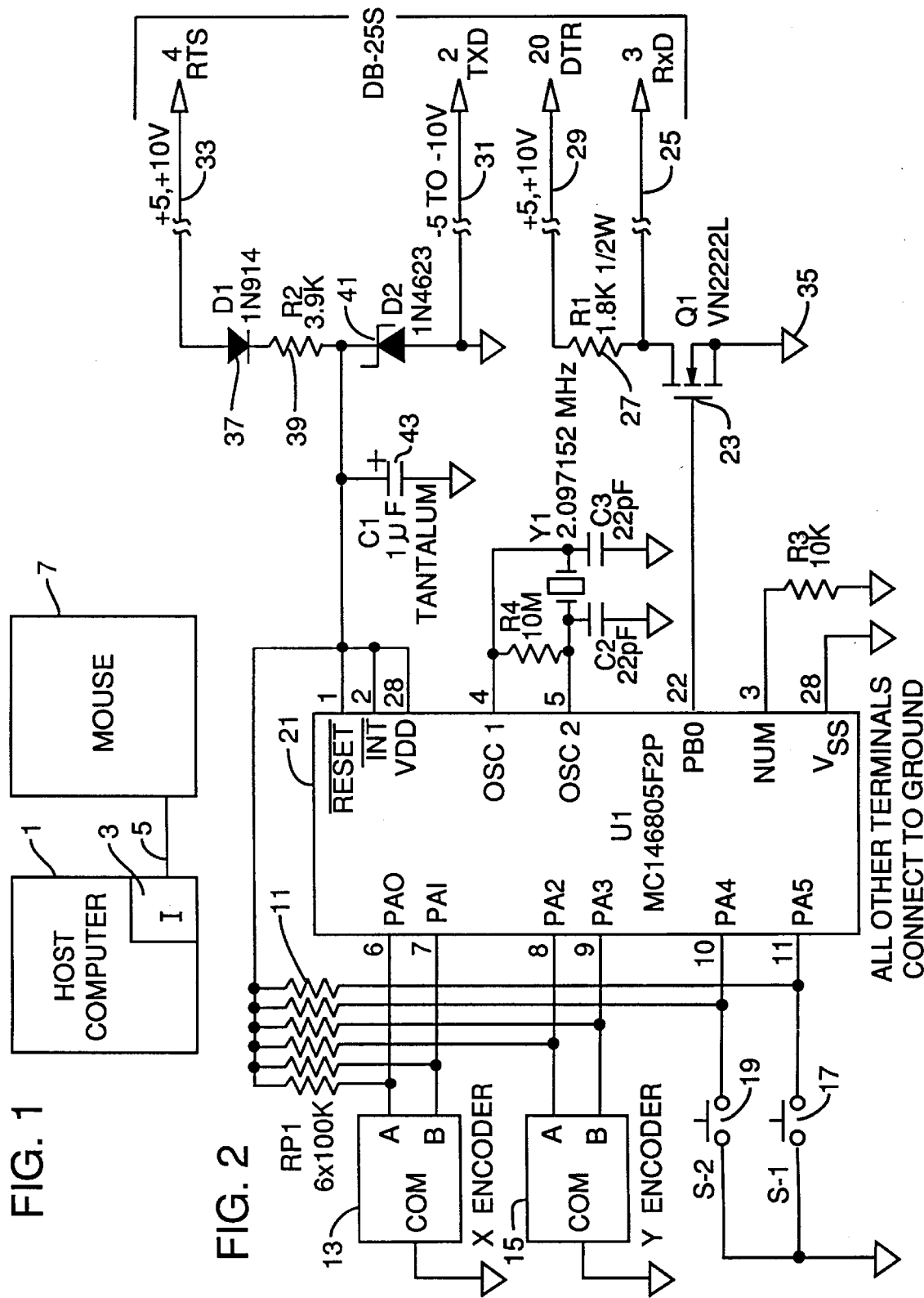

FIG. 3

|  | B6 | B5 | B4 | B3 | B2 | B1 | B0 |
|---|---|---|---|---|---|---|---|
| Byte 1 | 1 | LEFT | RIGHT | Y7 | Y6 | X7 | X6 |
| Byte 2 | 0 | X5 | X4 | X3 | X2 | X1 | X0 |
| Byte 3 | 0 | Y5 | Y4 | Y3 | Y2 | Y1 | Y0 |

PACKET-BASED MOUSE DATA PROTOCOL

This application is a continuation of Application Ser. No. 07/825,652, filed on Jan. 23, 1992, which is a division of application Ser. No. 07/626,393, filed Dec. 10, 1990, now U.S. Pat. No. 5,125,077, issued Jun. 23, 1992, which is a continuation of Ser. No. 07/568,057, filed Aug. 16, 1990, now abandoned, which is a continuation of Ser. No. 07/371,529, filed Jun. 26, 1989, now abandoned, which is a division of Ser. No. 07/119,314, filed Nov. 9, 1987, now U.S. Pat. No. 4,866,602, which is a continuation of Ser. No. 06/548,122, filed Nov. 2, 1983, now abandoned. The disclosure of U.S. Pat. No. 5,125,077 is incorporated herein by reference.

BACKGROUND OF THE INVENTION

1. Field of the Invention

This invention relates to a computer graphic input device known as a mouse and, more specifically, to a packet-based protocol for transmitting data from a mouse to a computer.

2. Description of the Prior Art

A mouse is a computer input device typically used for positioning a cursor on a computer video display screen. A typical physical embodiment of a mouse includes a small enclosure containing X-Y motion sensors, one or more push buttons operable externally of the enclosure, electrical interface circuitry, and a cable to connect the circuitry to a host computer. In operation, when the mouse is moved on a flat surface by a user, the motion sensors in the mouse detect the movement and direction of the mouse in the X-Y plane. The interface circuitry, typically within the mouse, converts the motion data produced by the sensors into a digital form usable by the host computer. Software in the host computer then utilizes the motion data to perform a particular function, for example, repositioning of the cursor on the display screen. The mouse also usually is provided with one or more switches, often in the form of push buttons, to enable alteration of the program flow in the host computer.

Mice of the above described type are normally classified by the manner in which motion is detected, the principal motion detection methods being mechanical and optical. Mechanical mice usually employ a technique whereby a spherical ball protrudes slightly below the bottom of the mouse enclosure which is free to roll as the mouse is moved by the operator along a flat surface. Inside the enclosure, the rotating ball is coupled to a pair of orthogonally mounted shaft position encoders by small rubber wheels or the like. Mouse motion is thereby converted into two pairs of quadrature signals, one pair for each axis of motion, thereby providing the required direction and displacement information corresponding to mouse movement. Optical mice utilize a method whereby a light source in the base of the mouse is reflected onto one or more photodetectors by a specially patterned surface over which the mouse is moved. Typically, a single chip computer translates the changes in detected luminance into direction and displacement signals which are utilized by the host computer in the manner described above.

BRIEF DESCRIPTION OF THE DRAWINGS

FIG. 1 is a block diagram showing a host computer with a mouse connected to a serial interface which is a part of the host computer; and FIG. 2 is a schematic diagram of a serial mouse in accordance with the present invention.

FIG. 3 is a drawing showing the arrangement of bits within a 3-byte packet according to a preferred embodiment of the present invention.

DESCRIPTION OF THE PREFERRED EMBODIMENT

FIG. 1 is a block diagram of a host computer 1 with an interface 3 which is connected by a cable 5 to a mouse 7. The host computer 1 includes a display device, usually a cathode ray tube, which is controlled by signals transmitted from the mouse through the cable 5 and the unmodified interface 3 to the host computer 1. The mouse 7 receives power for its operation via the unmodified interface 3 and along certain standard signal wires of the cable 5. In the preferred embodiment these signals are transmitted in accordance with the format defined by EIA Standard RS-232C.

In operation, in the preferred embodiment, the serial mouse sends a three-byte data package to the host computer whenever there is any change in the state of the mouse. A change of state is defined as any motion of the mouse or any change in the position of either of its buttons. The data packet sent to the host computer is an accumulation of all mouse activity that has occurred since transmission of the previous data packet. In other words, any mouse activity that occurs during the transmission of one data packet or thereafter will be accumulated for transmission in the succeeding data packet. This buffering technique allows the serial mouse to continuously track high mouse velocities while transmitting serially at a low baud rate, for example, 1200 baud. In the preferred embodiment each data packet sent by the mouse comprises three bytes. The format for each byte is:

|        | B6 | B5   | B4    | B3 | B2 | B1 | B0 |
|--------|----|------|-------|----|----|----|----|
| Byte 1 | 1  | LEFT | RIGHT | Y7 | Y6 | X7 | X6 |
| Byte 2 | 0  | X5   | X4    | X3 | X2 | X1 | X0 |
| Byte 3 | 0  | Y5   | Y4    | Y3 | Y2 | Y1 | Y0 |

Bit 6 (B6) is a sync bit, set for byte 1 of a data packet, reset otherwise.

LEFT represents the state of the left mouse button; a one (1) indicates the button is down (depressed), a zero (0) indicates that the button is up (released).

RIGHT represents the state of the right mouse button in the same manner as the left button.

X0–X7 is a signed, two's complement integer that represents the relative displacement of the mouse in the X-coordinate direction since the last data transmission. A positive value indicates mouse movement to the right, negative values indicate motion to the left.

Y0–Y7 is a signed, two's complement integer that represents the relative displacement of the mouse in the Y-coordinate direction since the last data transmission. A positive value indicates mouse movement downwards, negative values indicate motion upwards.

This arrangement of bits is also shown in FIG. 3.

FIG. 2 is a schematic drawing of the circuit of a serial mouse 7. The circuitry may be disposed either in the mouse housing, at the host computer 1 connected to the interface 3, or divided between the two, as desired. The mouse 7 includes an X shaft encoder 13, a Y shaft encoder 15, a pair of switches 17 and 19 and resistors 11 connected between a source of voltage (explained below) and each of the output terminals of the encoders 13 and 15 and the switches 17, 19. Although two switches are shown, the number of switches provided is arbitrary, but generally is a relatively small number to simplify operation of the mouse. The output terminals from each of the encoders 13, 15 and switches 17, 19 are connected to I/O ports PA0 to PA5 respectively of a microcomputer 21. The encoders and switches are also connected to a local ground. As explained below this local ground is different from the host computer ground. At least the encoders 13, 15, and the switches 17, 19, will be located in the mouse enclosure. All or part of the remaining circuitry can be located within the mouse enclosure, or at the host computer, connected to the mouse by a cable. The encoders 13, 15 are standard shaft encoders of a type that can be purchased from ALPS Electric or from other sources.

Microcomputer 21 is preferably an 8 bit CMOS Motorola MC 146805F2, as described in Motorola publication ADI-879, copyright 1982 by Motorola, Inc. The microcomputer is configured as specified in the above publication with the ROM of the microcomputer being configured according to the source code of the attached Appendix. The code shown in the Appendix, when loaded into the ROM, allows the microcomputer to understand the meaning of a high or low signal on any particular input line and to generate the digital code transmitted from the mouse to the host computer. Power to drive the microcomputer 21 is applied to terminal VDD which receives a positive voltage of about 4.3 volts with respect to VSS. VSS is the local ground, a voltage in the −5 to −10 volt range relative to the host computer ground. The clock rate of the microcomputer is determined by the crystal controlled circuit connected across the microcomputer OSC inputs, about 2.1 MHz in the preferred embodiment.

The host computer is programmed to normally place a voltage of plus 5 to 10 volts in the Request To Send (RTS) line 33 and the Data Terminal Ready (DTR) line 29 and a voltage of minus 5 to 10 volts on the Transmit Data (TXD) line 31. The Receive Data (RXD) line 25 transmits signals from the microcomputer 21 serially to the host computer 1 via the interface 3. This is accomplished by controlling the gate of transistor 23 via signals from the output PB0 of the microcomputer. The voltage on line 25 will be effectively local ground (−5 to −10 volts with respect to host computer ground) if the transistor is conducting, or the voltage on line 29 (+5 to +10 volts with respect to host ground) if the transistor is not conducting. All ground terminals in the drawing are local ground. Thus the microcomputer ground VSS takes the voltage on line 31 which is a negative voltage relative to the host computer ground. This arrangement eliminates the necessity of an additional transistor for voltage referencing between the microcomputer and the host computer. All signals on lines 29, 31 and 33 are bipolar relative to the host computer ground.

In actual operation, under programmed control of the host computer, RTS line 33 will always be at a positive voltage, TXD line 31 will always be at a negative voltage, and DTR line 29 will always be at a positive voltage. The voltages on lines 29, 31 and 33 are utilized in accordance with the present invention as a power source to provide power to the microcomputer 21 across VDD and VSS and to the transistor 23. Diode 37 is provided to prevent the supply voltage to the microcomputer 21 from becoming negative at VDD with respect to local ground. Resistor 39 is a current limiting resistor and Zener diode 41 establishes a voltage reference for the microcomputer 21. The capacitor 43 is a filter capacitor to remove ripple components.

Although the invention has been described with respect to a specific preferred embodiment thereof, variations and modifications will be apparent to those skilled in the art. It is therefore the intention that the appended claims be interpreted as broadly as possible in view of the prior art to include all such variations and modifications.

I claim:

1. In a method of operating a cursor control device having plural buttons, at least one position sensor, and circuitry for encoding data from said buttons and sensor into plural byte packets for transmission to an associated computer, an improvement comprising formatting each byte of the packet to include plural data bits, with a sync bit at an end thereof, the sync bit in the first byte having a value of "1" and the sync bit in succeeding bytes having a value of "0," wherein the first byte of the packet can be unambiguously distinguished from later bytes of the packet.

2. The method of claim 1 which includes transmitting said bytes to the computer using an RS-232 interface, said RS-232 interface providing start and stop bits permitting identification of the beginning of each byte.

3. The method of claim 1 which includes generating an 8-bit, signed two's complement representation of relative displacement in the X-direction comprising bits X7, X6, X5, X4, X3, X2, X1, and X0, and generating an 8-bit, signed two's complement representation of relative displacement in the Y-direction comprising bits Y7, Y6, Y5, Y4, Y3, Y2, Y1 and Y0, and in which the method further includes:

formatting the first byte to include successive bits X6, X7, Y6, Y7 in sequence;

formatting the second byte to include successive bits X0–X5 in sequence; and formatting the third byte to include successive bits Y0–Y5 in sequence.

4. The method of claim 1 which includes formatting each byte of the packet to include exactly six data bits.

5. The method of claim 1 which further includes:

coupling the cursor control device to the computer using a plural line RS-232 interface;

under control of a software driver in the computer, maintaining a first RS-232 line at a first voltage; and from a voltage potential between said first RS-232 line and a second RS-232 line, deriving an operating voltage to power circuitry within the cursor control device.

6. The method of claim 5 in which the circuitry includes a microcomputer, and the method includes powering the microcomputer from said operating voltage.

7. The method of claim 5 in which the circuitry includes a switching transistor for providing a data signal to the computer on a RXD line of said RS-232 interface, and the method includes powering said switching transistor from said operating voltage.

8. The method of claim 5 in which the second RS-232 line establishes a ground potential for the cursor control device.

9. The method of claim 5 in which one of said first or second lines is an RTS line.

10. The method of claim 5 in which one of said first or second lines is a TXD line.

11. The method of claim 5 in which one of said first or second lines is a DTR line.

12. In a method of operating a cursor control device having plural buttons, at least one position sensor, and circuitry for encoding data from said buttons and sensor into plural byte packets for transmission to an associated computer, an improvement comprising generating an 8-bit, signed two's complement representation of relative displacement in the X-direction comprising bits X7, X6, X5, X4, X3, X2, X1, and X0, and generating an 8-bit, signed two's complement representation of relative displacement in the Y-direction comprising bits Y7, Y6, Y5, Y4, Y3, Y2, Y1 and Y0, and in which the method further includes:

formatting the first byte to include successive bits X6, X7, Y6, and Y7 in sequence;

formatting the second byte to include successive bits X0–X5 in sequence; and formatting the third byte to include successive bits Y0–Y5 in sequence wherein the 8 bit representation of the relative displacement fits into a byte of less than 8 bits reducing the overall number of bits transmitted by the cursor control device.

13. A cursor control device comprising:

plural buttons;

first means for providing data relating to relative position;

second means for encoding data from said buttons and said first means into plural byte packets for transmission to an associated computer, each byte consisting of seven bits B0–B6, said second means formatting the first three bytes of the packet as follows:

|        | B6 | B5   | B4    | B3 | B2 | B1 | B0 |
|--------|----|------|-------|----|----|----|----|
| Byte 1 | 1  | Left | Right | Y7 | Y6 | X7 | X6 |
| Byte 2 | 0  | X5   | X4    | X3 | X2 | X1 | X0 |
| Byte 3 | 0  | Y5   | Y4    | Y3 | Y2 | Y1 | Y0 | where Left is a bit corresponding to a state of a left cursor control button, Right is a bit corresponding to a state of a right cursor control device button, Y0–Y7 is an ordered sequence of bits representing, in signed two's complement from, a displacement in the Y-direction, and X0–X7 is an ordered sequence of 8 bits representing, in signed two's complement form, a displacement in the X-direction wherein the first byte of the packet can be unambiguously distinguished from later bytes of the packet.

14. The cursor control device of claim 13 further comprising third means for deriving an operating voltage for the device from RS-232 lines coupling the device to the computer, said third means cooperating with fourth means in the computer for setting said RS-232 lines to preestablished signal levels.

15. In a cursor device having plural buttons, at least one position sensor, and formatting circuitry for encoding data from said buttons and sensor into plural byte packets for transmission to an associated computer, an improvement wherein said formatting circuitry formats each byte of the packet to include plural data bits, with a sync bit at an end thereof, the sync bit in the first byte having a value of "1" and the sync bit in succeeding bytes having a value of "0," wherein the first byte of the packet can be unambiguously distinguished from later bytes of the packet.

16. The cursor control device of claim 15 in which the formatting circuitry generates an 8-bit, signed two's complement representation of relative displacement in the X-direction comprising bits X7, X6, X5, X4, X3, X2, X1, and X0, and generates an 8-bit, signed two's complement representation of relative displacement in the Y-direction comprising bits Y7, Y6, Y5, Y4, Y3, Y2, Y1 and Y0, and in which the formatting circuitry:

formats the first byte to include successive bits X6, X7, Y6, Y7 in sequence;

formats the second byte to include successive bits X0–X5 in sequence; and formats the third byte to include successive bits Y0–Y5 in sequence.

17. The cursor control device of claim 15 in which the formatting circuitry formats each byte of the packet to include exactly six data bits.

18. The cursor control device of claim 15 which further comprises:

a plural line RS-232 interface for coupling to the computer;

circuitry for deriving an operating voltage to power circuitry in the cursor control device from a difference in voltage potential between first and second of said RS-232 lines.

19. The cursor control device of claim 18 in which the circuitry powered by the operating voltage includes a microcomputer.

20. The cursor control device of claim 18 in which the circuitry for deriving an operating voltage includes a zener diode.

21. The cursor control device of claim 18 in which the circuitry powered by the operating voltage includes a switching transistor that provides a data signal to the computer on a RXD line of said RS-232 interface.

22. The cursor control device of claim 18 in which the circuitry for deriving an operating voltage includes a resistor.

23. The cursor control device of claim 18 in which the second RS-232 line establishes a ground potential for the cursor control device.

24. The cursor control device of claim 18 in which one of said first or second lines is an RTS line.

25. The cursor control device of claim 18 in which one of said first or second lines is a TXD line.

26. The cursor control device of claim 18 in which one of said first or second lines is a DTR line.

27. The cursor control device of claim 15 including exactly two buttons.

28. The cursor control device of claim 15 in which each packet consists of exactly three bytes.

29. The cursor control device of claim 15 in which the formatting circuitry comprises a microcomputer.

* * * * *

UNITED STATES PATENT AND TRADEMARK OFFICE
CERTIFICATE OF CORRECTION

PATENT NO. : 5,838,304
DATED : November 17, 1998
INVENTOR(S) : Hall

It is certified that error appears in the above-identified patent and that said Letters Patent is hereby corrected as shown below:

<u>Title page,</u>
Application No. should read -- 08/947,044 --

Signed and Sealed this

Sixth Day of November, 2001

*Attest:*

NICHOLAS P. GODICI
*Attesting Officer*     *Acting Director of the United States Patent and Trademark Office*